Figure 1:
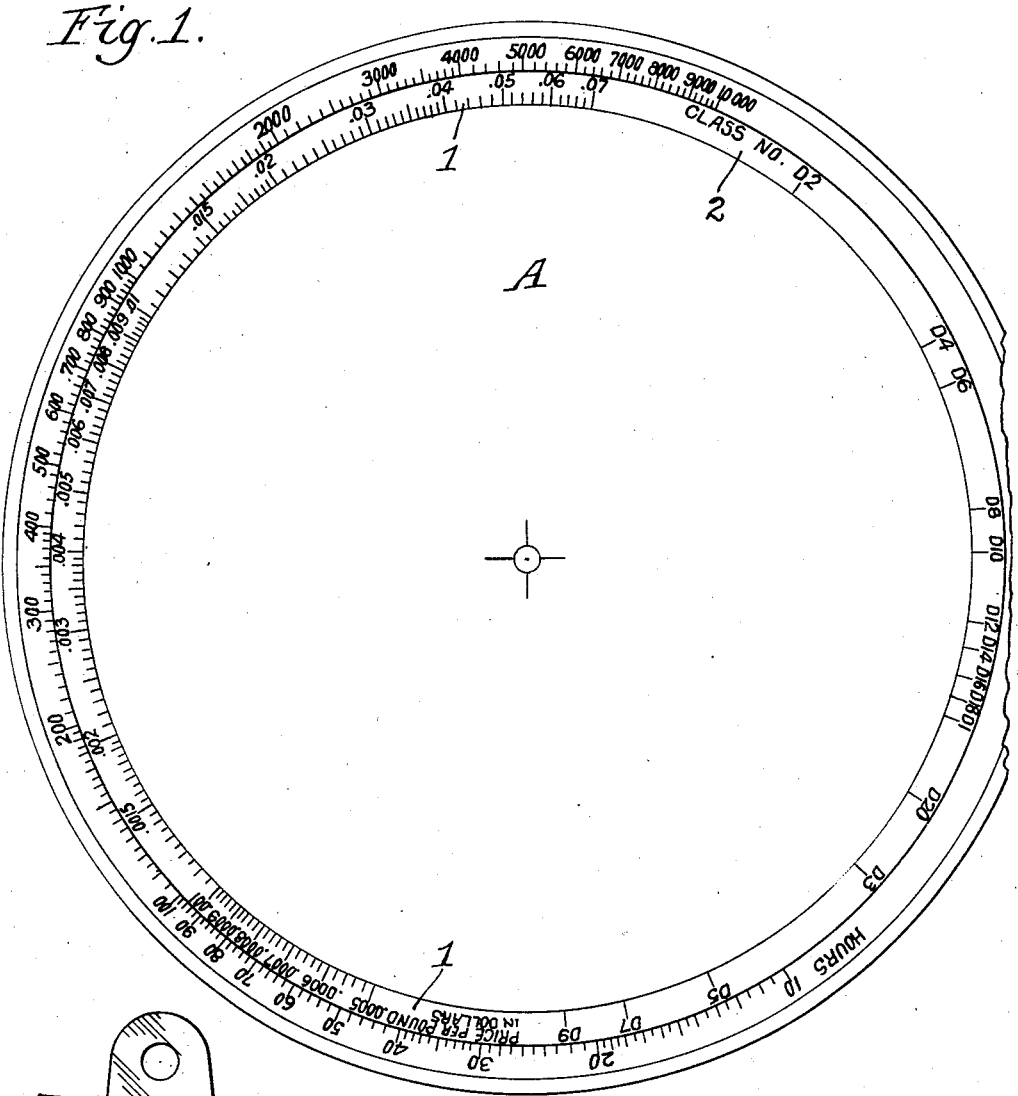

Feb. 13, 1940.   C. P. BERG   2,190,281
SLIDE RULE
Filed Aug. 8, 1935   3 Sheets-Sheet 1

Inventor
Christian P. Berg.
by Parker & Carter
Attorneys.

Feb. 13, 1940.  C. P. BERG  2,190,281
SLIDE RULE
Filed Aug. 8, 1935  3 Sheets-Sheet 2

Inventor
Christian P. Berg
by Parker & Carter
Attorneys.

Feb. 13, 1940.    C. P. BERG    2,190,281
SLIDE RULE
Filed Aug. 8, 1935    3 Sheets-Sheet 3

Inventor
Christian P. Berg
by Parker & Carter
Attorneys.

Patented Feb. 13, 1940

2,190,281

UNITED STATES PATENT OFFICE 2,190,281

SLIDE RULE

Christian P. Berg, Chicago, Ill.

Application August 8, 1935, Serial No. 35,277

3 Claims. (Cl. 235—84)

My invention relates to an improvement in slide rules and has for one purpose the provision of a slide rule, or its equivalent, marked or calibrated to permit the determination of a wide variety of classes of information, on the basis of past experience. My invention may be applied, for example, to obtaining an average of past costs, to assist in bidding on furture work, as in engineering, erecting, or the like. Another purpose or application of my invention is to ascertain the time necessary for particular operations in connection with manufacturing, engineering or the like. As will later appear, my invention may be applied to the determination of a wide variety of facts, where material is available for building up a scale or calibration which will express past performance or past experience or past averages. This material, whether it relates to the weight or value or cost per pound, expressed in dollars, or to any other of a wide variety of types of information, where it represents the average of past performance, may be expressed, for example, in logarithmic scales, and I have found it practical to construct a slide rule wherein such scales may be employed in order to determine from past experience the approximate cost of a given job, or the approximate time which will go into a given job or operation or sequence of operations.

As will later appear, my invention may be applied to the determination of almost any variety of facts, where material is available for building up a graph or a curve or a scale or an average which will express past performance or past experience. In considering one particular application of my invention, namely to erection engineering, for example the manufacture and erection of such installations as conveyors, coal preparation plants, elevators, traveling bridges and the like, a particular firm may have cost records and time records running back for decades. Where such material is now available, however, it may be necessary for anyone who wishes to use it to fumble through thousands of cards and records in order to build up the necessary averages. It is impossible to do this accurately in a short time, and there is an overwhelming tendency, even in important and well run organizations, to guess at costs. Where the ascertainment of costs or operation hours is of vital importance, as in bidding in competition with other firms, mistakes or guess work may be fatal to profits. And another assumption of the manufacturing or erection cost of a particular piece of equipment, may result in such a firm taking a very large contract, or a series of contracts, at a price which will not produce a profit.

In the present description of my invention I describe it as applied to the determination of the direct labor price or cost, per pound, of a predetermined product. In other words, more broadly stated, I determine the price or cost per unit of weight stated in a unit of currency. I also apply my invention to the determination of the total hours for a given job or operation or sequence of operations. This is of assistance not merely in bidding, but in scheduling work. It will be realized, however, that such applications of my invention are primarily illustrative, and that my invention may be applied readily to a wide variety of performance, industrial, commercial or scientific.

In taking together and analyzing the data of a particular plant, in relation to labor costs and time, I developed an equation which substantially satisfied all the curves or graphs that I plotted to express the past averages. This equation which I employ is as follows:

$$P = M(W^{-n})$$

In this equation P, for example, may equal the price or cost per pound stated in dollars. M is a constant for a class or group. W may be employed to express the weight, size, volume or number of units of a given job or lot of work.

In applying this equation to my slide rule I have employed two variants of it as follows:

$P = M(W^{-1/2})$ where M is a constant
$P = M(W^{-1/4})$ where M is a constant

In these equations P equals price, for example, price per pound in dollars, or price per unit. M is a constant or a class or group, and W is the weight, size, volume or number of units in a lot or body of work.

I found it practical to construct a slide rule whereon the solution of both equations can be directly read. I will not in the present description go into the details of the construction of logarithmic scales, as the construction of such scales is not per se part of the present invention. But the logarithmic scales applied to the herein illustrated slide rule may be considered to represent the average of past performance, in the matter of costs, and in the matter of time taken for certain operations, over a period of years.

I illustrate my invention more or less diagrammatically in the accompanying drawings, wherein—

Figure 6:
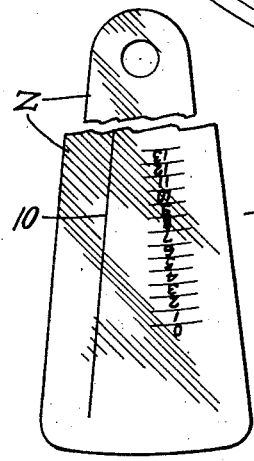
Figure 2:
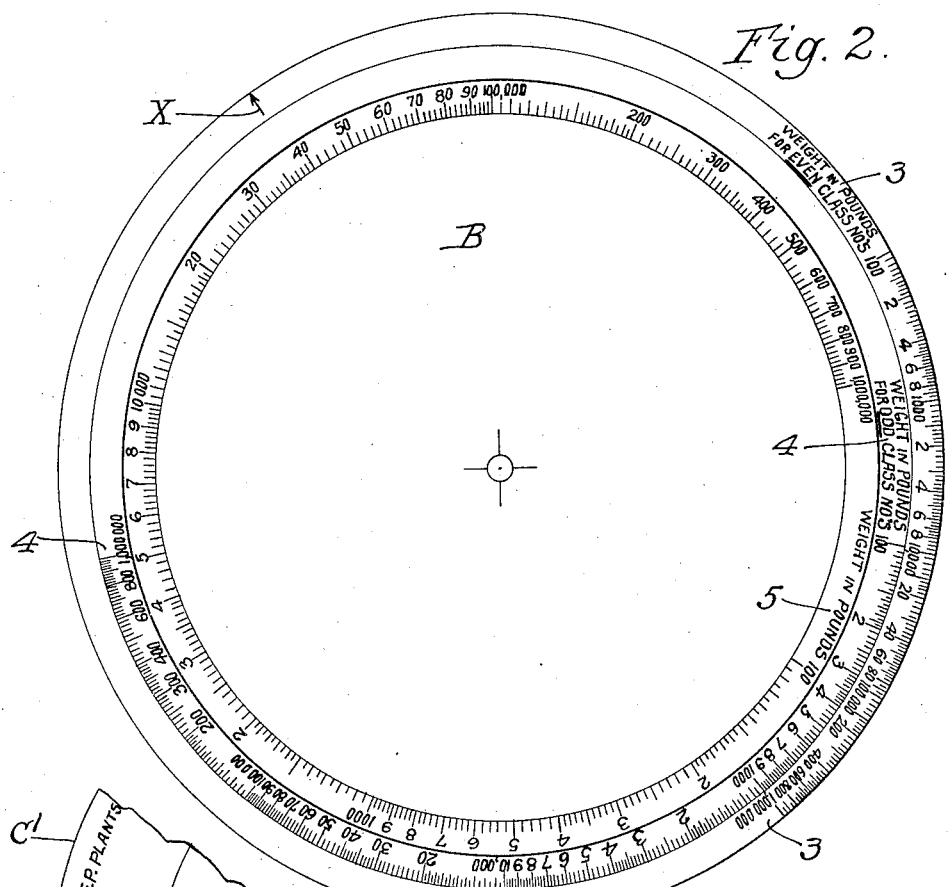
Figure 3:
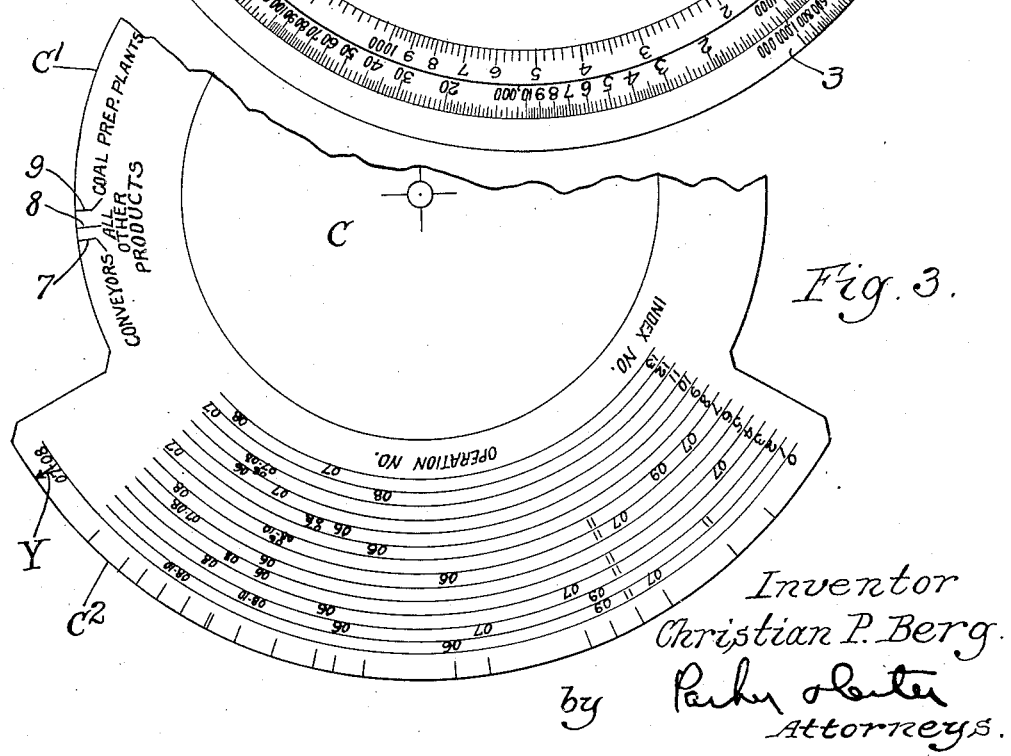
Figure 4:
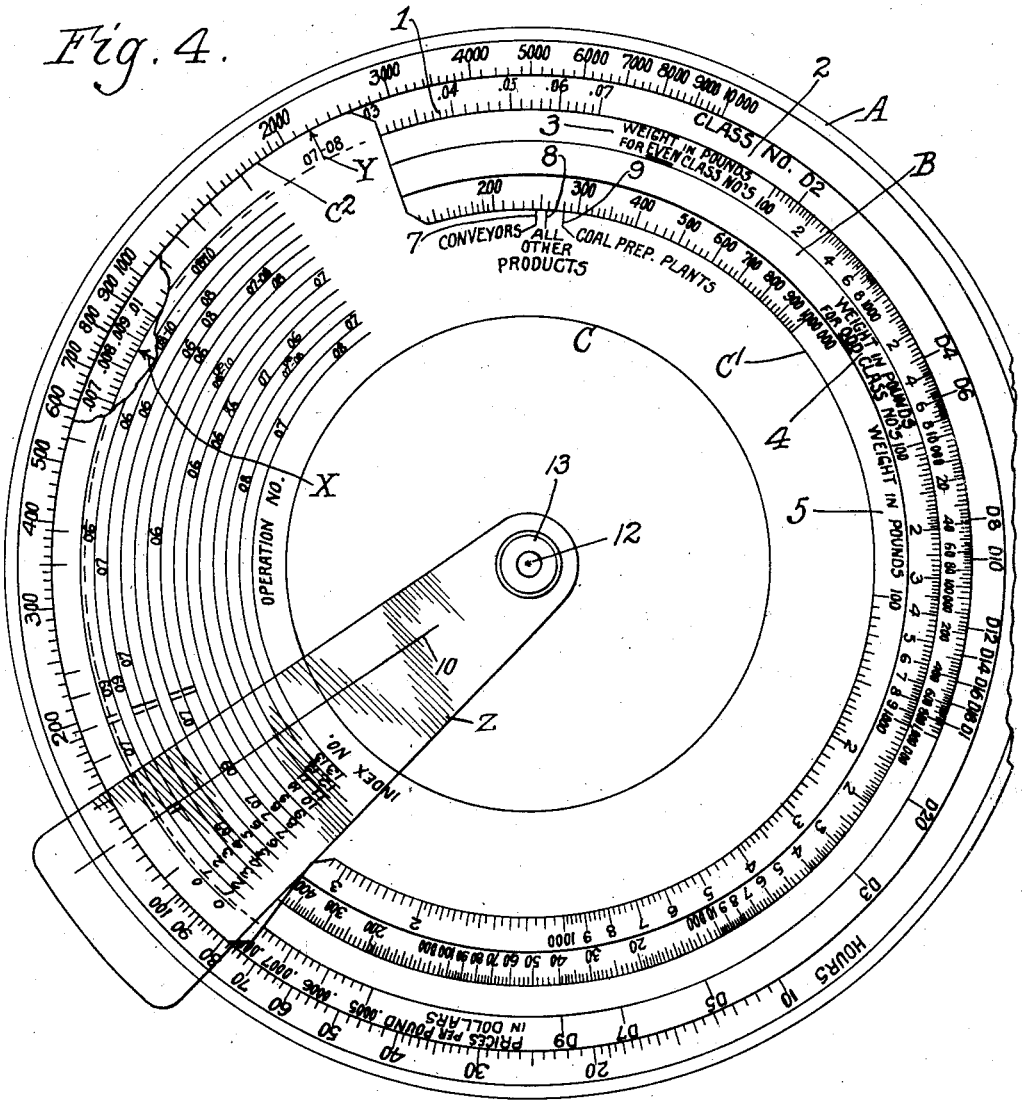
Figure 5:
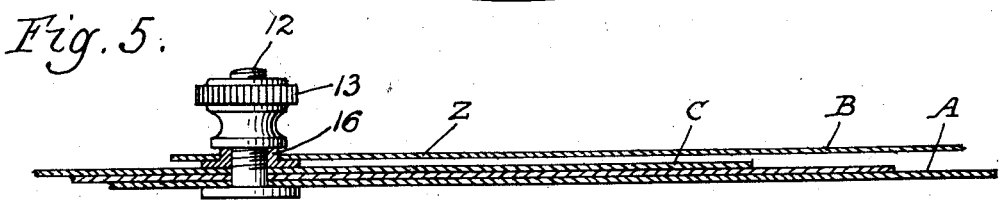

Figure 1 is a view of one disc or slide rule member, the bottom in the series later shown;

Figure 2 is a view of the second disc;
Figure 3 is a view of the top disc;
Figure 4 is a view of the complete slide rule;
Figure 5 is a vertical axial section illustrating the assembly of the discs; and
Figure 6 is a detail of the pointer.

Like parts are indicated by like symbols throughout the specification and drawings.

In considering the detailed use of the particular slide rule shown in the present drawings and described herein, it will be understood that it is adapted to perform two quite different operations. The first, which involves only the bottom disc A and the intermediate disc B is the determination of the price or labor cost per pound, expressed in dollars, of a particular job. The scale or calibration upon which the final result for its operation is read is the inner of the two scales shown on the bottom disc A as indicated at 1. Assume that the user wishes to determine the direct labor price per pound of a coal preparation plant weighing 280,000 pounds. He obtains his result by finding in the part 2 of the inner arc or circumference of the disc A, the proper class number for this particular type of equipment, because past experience may show that the direct labor price per pound varies widely with different articles or jobs. Let us say that the coal preparation plant is classified under D14. This then is the class number to which the total weight of the coal preparation plant, 280,000 pounds, is to be related, in order to determine the cost in dollars per pound. For convenience, I have applied to the intermediate disc B, two scales of weight in pounds, one, 3, for even class numbers, D2 and following, and one, 4, for odd class numbers, D—1 and following. I have applied the equation $P=M(W^{-1/2})$ for one set and the equation $P=M(W^{-1/4})$ for the other. As the coal preparation plant is an even numbered class the user reads the total weight, 280,000 pounds, on the even class numbered scale of weight which appears at 3 on the disc B and aligns it with the indicating class No. D14 of the disc A. When the discs A and B are held with the even class numbered weight scale having the number 280,000 aligned with the class No. D14, the pointer X on the disc B points to the proper price per pound in dollars as expressed in the scale 1 of the disc A. This happens to be $.00862, as will be shown, for example, in Figure 4, which is shown as expressing this particular problem.

To summarize, the disc A of my slide rule has a class number indication 2, and a price per pound in dollars indication 1. The disc B has a pointer X, which is opposed to this price per pound in dollars scale, and indicates the solution. The disc B also carries the weight in pounds scale for both the even class numbers and the odd class numbers, 3 and 4. When the total weight on the proper scale is aligned with the proper class number, then the pointer X points to the proper solution stated in price per pound in dollars. In the particular form of my invention this is the direct labor price per pound of the total installation but this is of course only one of many types of information which could be obtained in the same manner, depending upon what prior information or prior experience is embodied in the particular logarithmic scale employed.

The ordinary plant produces articles or sets up installations of widely varying type, wherein the direct labor price per pound may vary widely from article to article and from class to class. Hence the utility of having various class numbers, whereby the same scale of price per pound in dollars may be employed for determining such price or labor cost in relation to widely varying articles, operations or installations.

Referring again to the drawings, my slide rule is shown as a sequence of concentric discs, the bottom disc A, above discussed, the intermediate disc B, and the top disc C, all rotatable about a common pivot 12 and may be clamped by the thumb nut 13. In the price determining operation above discussed, only the discs A and B were employed. The purpose of the disc C will later appear. It will be understood, of course, that I can use either two or more discs, or two or more slides, and that I may employ moving members sliding rectilinearly in relation to each other, instead of rotating in relation to each other. The particular embodiment herein shown is applied to the determination not only of the cost of certain types of work, but of engineering and drafting time. Besides costs, it can be used to determine the number of hours or work and the number of hours of different kinds of work on different operations needed for the completion of a particular job. For example, it can be employed to determine the drafting time necessary, in plant construction. The various operations can be broken down into such individual items as general design, detailing of machinery, designing of steel work, building and supports for machinery, detailing of such steel work, buildings and supports, etc. My slide rule serves as a guide in planning or scheduling the work of a department, and virtually supersedes the necessity of checking over cost cards or time records.

As above explained, for cost information only the slides or discs A and B need be employed. For information in relation to drafting time or for the time of particular operations, it is necessary to employ also the top disc C. This disc has portions cooperating both with the disc A and with the disc B. Thus it has one circular edge C—1, which conforms closely to the inner scale 5 of the member B. The other edge C—2 conforms closely to the outer scale of the bottom disc A. The scale on the member B which cooperates with the disc C is a third or inner calibration, shown at 5, and is a statement of weight in pounds calibrated from 100 pounds to 1,000,000. This scale may, for example, indicate the weight of the particular plant or object or article about which time information is desired. As this information varies with various types of articles or products I have indicated, on the member C, three pointers 7, 8 and 9, relating to the particular types of product produced by the particular plant the records of which were employed in developing the particular slide rule shown in the accompanying drawings.

Assume that we are again using the example of the 280,000 pound coal washery. Note that one of the three points, 9, indicates a coal preparation plant. Therefore, this particular pointer is aligned with the weight 280,000, on the inner scale of the intermediate disc B. The pointer X of the disc B, in turn, is set at the already established price of $.00862. These two known factors or known facts establish the proper position of the discs B and C in relation to the disc A. The total number of hours is then indicated on the outermost scale of the disc A and is read off by the total hour pointer Y, which is located on the periphery of that portion of the disc C which has the maximum diameter. The indicated total of hours in this case is 2210.

If it is desired to break this total into the hours for specific operations, this can be done through the indicating members shown on the enlarged portion of the disc C. I indicate thereon a plurality of arcs, each arc being indicated by an index number, from 0 to 13. Obviously this particular numbering and arrangement is a matter of convenience but for the particular plant for which this slide rule was developed I find this a convenient arrangement. Each index number relates to an arc upon which arc are arranged at various points the numbers of the particular operations which form part of the total time consuming operations of the particular devices related to by the index numbers. I employ, for example, numbers from 06 to 11, which happen to be the last two digits of the operation numbering which I employ in an index of operations which is provided for the user of the slide rule. As an example, 05 may relate to the complete general design of the equipment. 07 may relate to detailing of the machinery. 08 may indicate the detailing of the steel supports. 09 may indicate design of the building, structural steel or wood. 10 may indicate detailing the building or structural steel. 11 may indicate checking. These are all factors or operations which can be expressed in necessary drafting time.

Continuing with our coal washery example, the index number of the coal washery is 2. Reading along the arc indicated by 2 the first operation number reached is 11. If we set the pointer Z so that its line 10 will pass through the appropriate marginal marking for the number 11, it indicates 132 hours on the outer peripheral scale of hours of the disc A. In other words, the operation 11, namely checking, for the above mentioned 280,000 pound coal washery, has indicated, from past experience, to be 132 hours. This is the expression of the past average for checking plants of this type and size. The next operation, 09, designing the building, of structural steel or wood, proves, from a similar use of the pointer, to take 218 hours. That is to say, past experience indicates that 218 hours of drafting time is necessary for the design of the building of the coal washing plant, whether of structural steel or wood. In moving from left to right along the arc, it will be understood that the operations are not taken in the sequence of performance, but that is unimportant. The next operation, 07, detailing of the machinery, is indicated by the pointer, on the marginal scale of the disc A, as involving 350 hours. The next operation 06, general design, is indicated on the scale as calling for 620 hours. The next two operations, 08 and 10, lumped together, detailing the steel supports and detailing the building, total 890 hours. The time given for these various operations, when added up, equals the 2210 hours indicated by the marker Y on the marginal scale. Thus, with the type of machinery or equipment known, its total weight known, and its cost per pound known, the drafting time can be determined, both for the entire device or installation, or for individual operations.

As regards the mechanical make-up of the slide rule, it will be observed from Figure 5 that the rotation of the thumb nut 13 about the screwthreaded portion 12 will clamp the washer 14 against the top of the disc C. The three discs will thereby be locked against the enlarged portion 15 of the screw 12. Note that the washer 14 has a sleeve 16 about which the pointer Z is freely rotatable. In other words, the discs may be locked together in position but the pointer Z can still freely move. Note also that the length of the pointer Z is such that it, and its radial indicating line 10, extends outwardly along the periphery of the larger or bottom disc A.

It will be realized that whereas I have described and shown a particular application of my device, its details are given largely for purpose of illustration. In other words, no two plants need use an identical slide rule, although the principle of operation may be the same. The past averages can be readily determined from past records but will of course differ from plant to plant.

The use and operation of my invention are as follows:

I have developed a means for obtaining information based on past performance, past experience or past average, which is available for determining direct labor hours or labor costs in relation to any manufactured article or articles or in relation to any articles which are handled or processed or in any way subjected to the employment of labor. Similarly, my invention can be applied to determining hours or time periods necessary in processing articles and while I find a very practical application of my invention to be the determination of labor hours and labor costs I do not wish to be so limited in my claims unless such limitation appears upon the face of some particular claim or claims. Each can equally well be applied to the determination of price, sales costs, etc. It is, of course, applicable to building or construction work per se or engineering work in general. It is applicable to warehousing, to the handling of goods, to the storage of goods, and of course, to the manufacture and sale of goods.

In a broad sense my invention involves building up or employing a mass of detail obtained from past experience into scales, preferably logarithmic, from which the user can mechanically determine totals. These totals can then be broken down into details as desired. For example, as above described, I can obtain the total labor hours requisite for a given operation or series of operations, reading off from the pointer Y on the hour scale about the periphery of the disc A. Or I can break down this total into the particular individual operations and I provide, on the enlarged portion of the disc C the necessary classification, keyed in index numbers and operation numbers, for determining the operation times stated, for example, in hours of work. The simplicity of my invention and the saving of time and effort is simply incalculable. As above stated, I can just as simply determine labor costs in relation to particular installations, articles or steps, relating the total labor costs, for example, to the total weight of the particular article or jobs involved. I have described the use of my invention in detail above and need not repeat it here but it will be realized that, properly stated, my invention relates to the simplified employment of past experience whereby the user can, in relation to a present or future job, determine, on the basis of past experience, what the labor cost will be or what the hours of labor will be as for a particular job. The value of this ease of information determination in relation not merely to plant operation, but to bidding, is enormous.

I claim:

1. In a slide rule for determining manufacturing costs, a plurality of relatively movable members each having scales thereon, the scale of one of said members being divided into a group of calibrations indicating the class of work being figured and a group of calibrations indicating price, said groups being in end to end relationship, another of said relatively movable members having its edge lying adjacent the edge of the class and price scale on the first member and having thereon two scales lying adjacent each other and the class indicating scale and cooperating therewith, one of said scales being calibrated for work in an even numbered class and the other being calibrated for an odd numbered class, said two scales progressing in the same direction and being offset with respect to each other, and a single indicating pointer positioned on the edge of said other member and cooperating with the price scale on the first member so as to indicate price thereon when the members are moved relative to each other so that a graduation for a known factor on the scale of the second member in either an odd or an even numbered class registers with its proper class calibration on the first member.

2. In a slide rule for determining manufacturing costs, a plurality of relatively movable members each having scales thereon, the scale of one of said members being divided into a group of calibrations indicating the class of work being figured and a group of calibrations indicating price, said groups being in end to end relationship, the first group being divided into calibrations indicating an even numbered and also an odd numbered class of work with one group forming a continuation of the other and both progressing in the same direction, another of said relatively movable members having its edge lying adjacent the edge of the class and price scale on the first member and having thereon two scales lying adjacent each other and the class indicating scale and cooperating therewith, one of said scales being calibrated for work in an even numbered class and the other being calibrated for an odd numbered class, said two scales progressing in the same direction and being offset with respect to each other, and a single indicating pointer positioned on the edge of said other member and cooperating with the price scale on the first member so as to indicate price thereon when the members are moved relative to each other so that a graduation for a known factor on the scale of the second member in either an odd or an even numbered class registers with its proper class calibration on the first member.

3. In a slide rule for determining time, a plurality of relatively movable members, one of said members having a continuous scale thereon calibrated in hours, a second member having a continuous scale thereon calibrated in pounds, and a third member having indicating pointers on the edge thereof adjacent to the edge of the scale on the second member and cooperating therewith, the pointers indicating different classes of work being figured, said third member also having a result pointer on another edge thereof spaced from the first mentioned pointers and lying adjacent to and cooperating with the hour scale on the first member, the three members cooperating with each other so that movement of one of the class pointers on the third member into registry with a graduation representing a known factor on the scale of the second member causes the result pointer to indicate the result in hours on the scale of the first member.

CHRISTIAN P. BERG.